United States Patent
Kedlaya et al.

(10) Patent No.: US 11,475,122 B1
(45) Date of Patent: Oct. 18, 2022

(54) MITIGATING MALICIOUS CLIENT-SIDE SCRIPTS

(71) Applicant: Shape Security, Inc., Santa Clara, CA (US)

(72) Inventors: Madhukar Nagaraja Kedlaya, Sunnyvale, CA (US); Timothy Charles Disney, Santa Clara, CA (US); Nitish Kishore Khadke, Mountain View, CA (US); Claire Madison Schlenker, Redwood City, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 7 days.

(21) Appl. No.: 17/232,805

(22) Filed: Apr. 16, 2021

(51) Int. Cl.
  *H04L 29/06* (2006.01)
  *G06F 21/54* (2013.01)

(52) U.S. Cl.
  CPC ........ *G06F 21/54* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 7,721,303 B2 * | 5/2010 | Alves de Moura | G06F 8/38 709/202 |
| 9,178,904 B1 | 11/2015 | Gangadharan et al. | |
| 9,398,032 B1 | 7/2016 | Wan et al. | |
| 9,680,848 B2 | 6/2017 | Kim et al. | |
| 11,086,644 B1 * | 8/2021 | Balaram | G06F 16/245 |
| 11,163,586 B1 * | 11/2021 | Mathur | G06F 9/3005 |
| 2003/0078960 A1 * | 4/2003 | Murren | H04L 67/34 709/203 |
| 2003/0078965 A1 * | 4/2003 | Cocotis | H04L 63/029 709/203 |

(Continued)

FOREIGN PATENT DOCUMENTS

WO     2014113597 A     7/2014

OTHER PUBLICATIONS

Shroff, Pratiksha H.; Chaudhary, Seema R. Critical rendering path optimizations to reduce the web page loading time. 2017 2nd International Conference for Convergence in Technology (I2CT). https://ieeexplore.ieee.org/stamp/stamp.jsp?tp=&arnumber=8226266 (Year: 2017).*

(Continued)

*Primary Examiner* — Jeremiah L Avery
(74) *Attorney, Agent, or Firm* — Troutman Pepper Hamilton Sanders LLP

(57) ABSTRACT

Technology related to detecting and/or mitigating malicious client-side scripts is disclosed. In one example, a method includes sending a request for a page of a client application. In response to the request for the page, the page and a supervisory script of the page are received. The supervisory script of the page of the client application can be executed within a client environment. The supervisory script can override an operation associated with an architected application programming interface (API) of the client environment. During rendering of the page, a call to the architected API of the client environment can be serviced by performing a modified operation that is different than the architected operation associated with the architected API.

20 Claims, 8 Drawing Sheets

(56) References Cited

U.S. PATENT DOCUMENTS

| | | | | |
|---|---|---|---|---|
| 2012/0036264 A1* | 2/2012 | Jiang | ............... | H04L 67/02 709/226 |
| 2012/0159629 A1 | 6/2012 | Lee et al. | | |
| 2014/0129920 A1* | 5/2014 | Sheretov | ............ | H04L 63/20 715/234 |
| 2016/0179850 A1* | 6/2016 | Martin | ............ | G06F 16/278 707/634 |
| 2021/0383489 A1* | 12/2021 | Hutchinson | ......... | G06Q 50/14 |

OTHER PUBLICATIONS

Raji, Mohammad et al. Scalable web-embedded volume. rendering. 2017 IEEE 7th Symposium on Large Data Analysis and Visualization (LDAV). https://ieeexplore.ieee.org/stamp/stamp.jsp?tp=&arnumber=8231850 (Year: 2017).*

Nakano, Yuusuke et al. Web performance acceleration by caching rendering results. 2015 17th Asia-Pacific Network Operations and Management Symposium (APNOMS). https://ieeexplore.ieee.org/stamp/stamp.jsp?tp=&arnumber=7275434 (Year: 2015).*

* cited by examiner

MITIGATING MALICIOUS CLIENT-SIDE SCRIPTS

FIELD

The present disclosure generally relates to client-server computing systems, and relates more specifically to techniques for detecting and/or mitigating malicious client-side scripts that execute on a client computer.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Responding to the requests can include retrieving data and/or executing a task at the application server and/or providing a client-side script to be executed on the client device. A client-side script can be used to reduce a processing load at the application server and may provide a more responsive user experience by reducing and/or eliminating round-trip travel time of network communications between the client and the server for some operations. However, client-side scripts can potentially be compromised by attackers seeking to gather personal and/or confidential information from a user when the client-side scripts are executed on a client device. There can be many challenges in implementing client-side scripts that maintain a high performance, highly available, and secure client-server architecture when the client-side scripts may be targets for attackers.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network computer system comprising one or more client computers or server computers, the method including: sending a request for a page of a client application; in response to the request for the page, receiving the page and a supervisory script of the page; executing the supervisory script of the page of the client application within a client environment, the supervisory script overriding an operation associated with an architected application programming interface (API) of the client environment; and during rendering of the page, servicing a call to the architected API of the client environment by performing a modified operation that is different than the architected operation associated with the architected API.

Other embodiments incorporating this example include corresponding computer systems, apparatus, and computer programs recorded on one or more non-transitory computer readable media (e.g., computer storage devices), each configured to perform the actions of the methods. An example computer system includes one or more network computer modules, networking modules, or server modules, memory comprising programmed instructions stored thereon, and one or more processors configured to be capable of executing the stored programmed instructions to perform the actions of the methods. An example non-transitory computer readable medium having stored thereon instructions for detecting and/or mitigating malicious client-side scripts that execute on a client computer, the instructions comprising executable code that, when executed by one or more processors, causes the processors to perform the actions of the methods. An example network traffic manager includes memory comprising programmed instructions stored thereon and one or more processors configured to be capable of executing the stored programmed instructions to perform the actions of the methods.

DETAILED DESCRIPTION

Introduction

Figure 1:
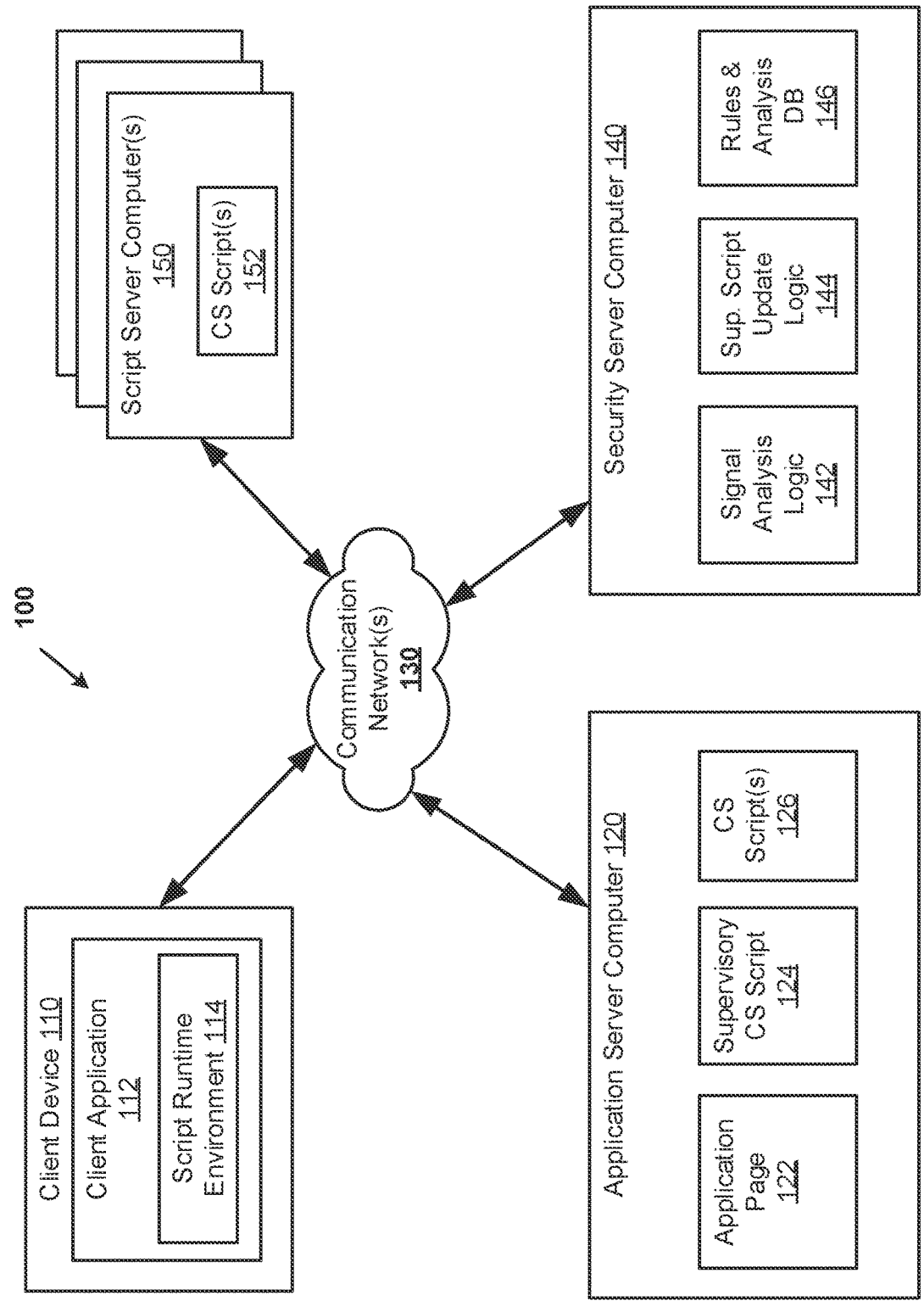
FIG. 1 illustrates a system diagram of an example client-server computer system that can be used for detecting and/or mitigating malicious client-side scripts.

A software application (such as a web application or a network application) can be implemented using a client-server architecture. For example, the client-server architecture can include a server computer that stores content that is accessible from a network by a client device that can request the content from the server computer. The client device can present the content (e.g., a web page) and a user-interface to a user of the client device.

As a specific example, the client device can execute a browser application (also referred to as a web browser or a browser) for requesting web pages and other content from a server computer. The content can include programs, objects, metadata, and other data that are stored in one or more files and that can be used to generate a web page and display the page in the browser on the client device. The browser can provide a client environment including a Document Object Model (DOM) to interpret the content from the server and render the page on the client device. The page can be interactive, such as when providing a user interface that presents information to a user through a display and/or speakers, and enables the user to enter information using a keyboard, mouse, or touchscreen. The objects on the page can be specified using Application Programming Interfaces (APIs) of the client environment, where the client environment can include a client application and a runtime environment of the client application. An API is a programmatic interface (e.g., a set of methods, events, protocols, and/or data formats) for communicating among different software modules and/or for formatting information within a software module. An architected API (also referred to as a native API) is an API that defines a default function, behavior, or object within a given environment, such as the client environment. For example, the browser can provide a set of architected APIs defining operations that can be performed by the browser (e.g., data and/or image manipulation, creating network requests, event detection, event handling, audio/video functionality, and other functionality). The browser can support different runtime environments (such as a JavaScript runtime environment), which can provide additional functionality to the content using the architected APIs of the runtime environment. A developer can create an application to execute on the client environment using the architected APIs of the client environment. For example, developers can specify the contents and behavior of a web page using the architected APIs of Hypertext Markup Language (HTML) and JavaScript.

A web page may include no or multiple client-side scripts. A client-side script is a program that includes instructions that are executable within a client environment. The instructions of the client-side script can be specified using APIs of the client environment, such as instructions of a programming language that is supported by the client environment. Client-side scripts of a given page can be provided in different ways and sourced from a variety of sources by specifying a source of the scripts. As one example, a publisher of a page can include the script directly within the page (this type of script can be referred to as an inline script). As another example, a location of the script can be referenced within the page, such as by specifying the source of the script using a domain name within a Uniform Resource Identifier (URI) or a Uniform Resource Locator (URL). Generally, a URI is a sequence of characters that identifies a network-accessible resource by a type and a location. A URL is a URI that identifies a network-accessible resource using a representation of its access mechanism. For example, the URL "http://www.applicationServer.com/examplePage" identifies the network resource "examplePage" which can be obtained using the Hypertext Transfer Protocol (HTTP) from the network host having the domain name "www.applicationServer.com." The page can include scripts and/or a reference to a script using a URI associated with the script. After the page is loaded by the browser, the script(s) of the page can be identified by their respective URIs and the scripts can be loaded by sending requests for the scripts to the servers identified by the domain names of the URIs.

Client-side scripts can be categorized in multiple ways, such as the author of the script or the where the script is hosted. One source of client-side scripts can be the publisher of the page. As used herein, the publisher of the page is the creator of the primary content of the page. The publisher of the page can host the pages on the publisher's servers or on the servers of a provider of network-accessible computing resources. Scripts that are created by the publisher of the page and/or hosted on a server on the same domain as the primary content of the page can be referred to as first-party scripts. Another source of client-side scripts can be advertisers and other partners of the publisher, for example. The scripts that are not created and/or sourced by the publisher can be referred to as third-party scripts. The scripts can enrich the content of the page by interacting with the objects of the page and providing an additional source of content. For example, the scripts can add functionality related to data collection, data presentation, advertisement, analytics, networking, communication, widgets, and other tools that enhance the page for the publisher and/or the user. However, having scripts distributed among different providers and different locations can potentially increase an attack surface of the client-server application. Specifically, attackers can compromise pages and/or scripts to insert malicious code into the pages and/or scripts. Such malicious code may gather data in one or more objects defined in the page, load and run additional malicious web code, and/or exfiltrate sensitive data. For example, when the user enters authentication information and/or credit card information in a browser displaying the page, the malicious web code may gather and forward the information to a server under control of the attacker. Such activity may occur without being detectable by a typical user.

As disclosed herein, malicious client-side scripts can potentially be detected and the impact of the malicious client-side scripts can be mitigated by implementing a supervisory script on a page that is rendered within a client environment. The supervisory script can be configured to load before other scripts when the page is loaded in a browser or other application. For example, a reference to the supervisory script can be positioned earlier in a sequence of instructions/API calls specifying the page than other scripts or references to other scripts.

The supervisory script can collect various information about how the page is used and how the scripts of the page interact with the page and user input. For example, the supervisory script can collect information that may indicate which scripts within the page might be exfiltrating data from the page and/or are performing actions that may circumvent detection by the supervisory script. As one example, the supervisory script can identify all scripts that add event listeners to the page. As another example, the supervisory script can identify scripts that: directly access the contents of form fields, create iframes, make outbound network requests, and access sensitive data from event objects (such as keyboard and input events). The supervisory script can identify the domains and/or URIs of outbound network requests. As one example, the supervisory script can monitor a call stack of the client runtime environment to determine which scripts invoke the functions and properties that are to be collected. The stack can be monitored by throwing and catching exceptions when the functions or properties are accessed. The exceptions can be handled by the supervisory script. The supervisory script can store the collected information in a data structure so that the specific architected APIs and/or domains (or URIs) used by each script can be determined.

The collected information can be analyzed at the client device and/or sent to a security service for analysis. As one example, the collected information can be finalized and/or sent to a security service when the "beforeunload" event is asserted by the browser. By sending the collected data when the page is about to be unloaded, a relatively complete set of script activity for the page can be sent to the security service. As one example, the security service can be provided at a security server computer by a provider that partners with the publisher of the page. By analyzing the collected data, the security service can determine whether any of the scripts may be malicious performing potentially malicious actions. For example, a script may be malicious if it is loaded from a URI or domain that is suspected of being associated with malicious activity. A script may be performing malicious actions if the script collects data from sensitive form fields of the page (such as a password field, a user name field, a credit card or bank account number field, and so forth) and sends the collected data to an unexpected domain or a domain that is associated with malicious activity. When potential malicious activity is detected, a policy rule can be generated to detect and/or mitigate malicious activities. For example, the policy rules can include preventing scripts associated with malicious domains from loading and/or blocking information from being sent to malicious domains using outbound network requests. Additionally, the collected data can be analyzed and used to identify and create safeguards for the architected APIs that may be at risk from malicious activity.

The supervisory script can potentially mitigate malicious activity by overriding architected APIs of the client environment. Overriding the architected APIs can also be referred to as virtualizing the APIs. For example, the supervisory script can supplement and/or override some or all of the functions performed by the architected APIs. Specifically, the supervisory script can redefine the functions and/or properties of some or all of the architected APIs of the client environment. Because the supervisory script is loaded before other scripts on the page, calls to the architected APIs in the later-loaded scripts will behave according to the overriding functionality that is defined by the supervisory script. Generally, the overriding functionality can include functions added for: collecting usage data, applying policy rules, disabling or altering architected properties and/or functionality, and adding new properties and/or functionality for implementing a mitigation strategy.

Mitigating actions can include blocking a set of scripts from accessing data entered in form fields and/or blocking information from being sent to a set of domains or URIs. A first mitigation strategy can include disabling reading of values from a form field by bypassing the invocation of an architected DOM API when a domain associated with the script calling the API is to be blocked. The domains to be blocked can be maintained in the policy rules. The domain associated with the script can be determined by observing the invocation call stack. The overriding functionality can return a fake value such as an empty string when any blocked script tries to read the value of any sensitive form field. A second mitigation strategy can include disabling loading of any resource by intercepting network invocation APIs, checking the arguments of those to see if any domain that is blocked is being loaded, and silently failing to invoke the original DOM API. In some cases, such as XMLHttpRequest (XHR) or fetch, the overriding functionality can mutate the original object or return a dummy object in order to potentially fool the attacker that the network request was successful.

A set of APIs (e.g., a script), file, and/or web page can be of different types and have different file extensions. The set of APIs (e.g., a script), file, and/or web page can be stored in persistent storage on the client or the server. For example, a web page may be generated dynamically by the server based on one or more parameters. While some files may be identified as a particular type of file, such as an HTML file or JavaScript file, a file may include mixed content. For example, an HTML file may include HTML, JavaScript, Cascading Style Sheets (CSS), and/or any other standard and/or proprietary set of APIs. Furthermore, a file need not be stored in persistent storage. For example, a file can be stored in volatile random-access memory (RAM). It should be noted that while some of the APIs in some of the examples discussed herein are HTML and JavaScript instructions, in other examples, the APIs may be any other standard and/or proprietary APIs configured to be executed within a client environment on a client computer.

Example Architectures for Detecting and/or
Mitigating Malicious Client-Side Scripts FIG. 1 illustrates an example of a client-server computer system 100 including a client device 110 and an application server computer 120. Specifically, FIG. 1 illustrates that the client-server computer system 100 can be used for detecting and/or mitigating malicious client-side scripts. The client-server computer system 100 can also including a communication network(s) 130, a security service server computer 140, and one or more script server computer(s) 150. The client-server architecture 100 can be implemented using a client-server architecture as described in more detail with reference to FIG. 7, where the different components (110, 120, 130, 140, 150) of the client-server architecture can be implemented using a computing environment as described in more detail with reference to FIG. 8.

The client device 110 can be a computing device capable of sending network traffic over a communications network (e.g., network 130). For example, the client device 110 can be a mobile computing device, a desktop computing device, a laptop computing device, a tablet computing device, a virtual machine executing on a cloud-based computing environment, and so forth. The client device 110 can communicate with the different server computers 120, 140, and 150 via the communication network(s) 130. Each of the server computers 120, 140, and 150 can be a computing device capable of sending network traffic over a communications network (e.g., network 130) and processing requests by client devices (such as the client device 110). Each of the server computers 120, 140, and 150 can include multiple hardware and/or software server resources (not shown), a virtual machine executing on a cloud-based computing environment, and so forth. The server computers 120, 140, and 150 can execute server software applications, such as an HTTP server application, for example.

The client device 110 can execute a client application 112 (e.g., a browser or other software application) that requests content (e.g., pages, scripts, and other content) from the application server 120. For example, the content can include an application page 122 (e.g., a web page) that is rendered on the client device 110 using the client application 112 and a script runtime environment 114. The application page 122 can include scripts and/or references to scripts that can be executed on the client device 110 using the client application 112 and/or the script runtime environment 114. For example, the application page 122 can include a supervisory client-side (CS) script 124. The supervisory client-side script 124 can be loaded before other scripts that are included on and/or referenced by the application page 122. The application page 122 can include references to other client-side scripts 126 that are served from the application server computer 120 and references to client-side scripts 152 that are served from the script server computers 150. The scripts 126 and 152 can include functionality to the page 122 related to authentication, data collection, data presentation, advertisement, analytics, networking, communication, and so forth.

When the supervisory client-side script 124 is executed on the client device 110, using the client application 112 and/or the script runtime environment 114, the supervisory script 124 can create a layer of controls between the client application 112 and other scripts (e.g., scripts 126 and 152) that may be referenced by the application page 122 and be executed when the page 122 is rendered. The layer of controls can be used to collect information about how the scripts 126 and 152 interact with the elements of the application page 122. The collected information can be used to potentially detect and/or mitigate malicious activity caused by the scripts 126 and 152. For example, the layer of controls can determine which APIs of the client application 112 and the script runtime environment 114 are used by each of the scripts. The layer of controls can determine URIs and/or domains used in outbound network requests initiated by the scripts. The collected information can be sent to the security server computer 140. The information can be structured as signals, where each signal can correspond to a script or an API, for example. As one example, the signals can be encoded, compressed, and/or encrypted.

The collected information can be analyzed by the supervisory client-side script 124 or sent to the security server computer 140 for analysis. Performing the analysis external to the client device 110 can shield the details of the analysis from attackers or others that could reverse engineer the analysis by observing the execution of the client device 110. The security server computer 140 can include signal analysis logic 142, supervisory script update logic 144, and a rules and analysis database (DB) 146.

The signal analysis logic 142 can use the collected information to potentially detect malicious activity of the scripts 126 and 152 executing on the application page 122. As one example, script activity can be collected over time to determine an expected set of activities by the scripts. If newly collected information indicates that script behavior has changed, then the script may have been compromised by a malicious attacker. Changes can be further analyzed to determine whether the script gathered data from any or specific form fields, and/or whether the data was sent to unknown and/or malicious domains. As another example, the script activity can be analyzed to determine whether data from sensitive form fields (such as a password field or an account field) is gathered by the scripts. Output from the signal analysis logic 142 can be used to update the rules and analysis database 146 and to modify the supervisory script 124. For example, when potentially malicious behavior is identified, the supervisory script 124 can be updated (such as by the supervisory script update logic 144) to prevent or reduce an impact from the potentially malicious behavior. The supervisory script update logic 144 can send updates of the supervisory script 124 to the application server computer 120 so that the supervisory script 124 can be adapted to mitigate new threats.

Figure 2:
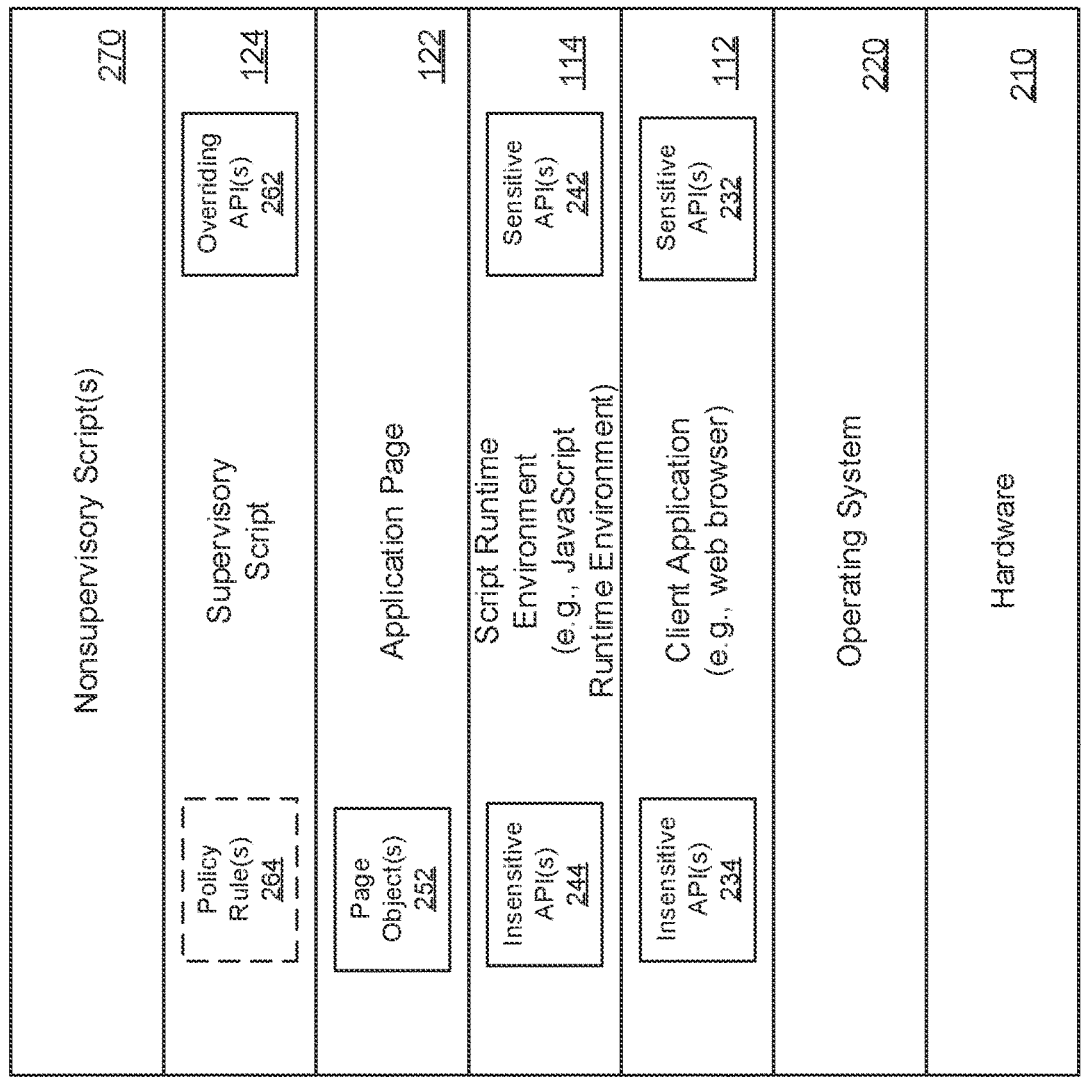
FIG. 2 illustrates an example of a software stack for executing a supervisory script that can be used for detecting and/or mitigating malicious client-side scripts.

FIG. 2 illustrates an example of a software stack 200 for executing a supervisory script 124 on a client device (such as the client device 110 of FIG. 1) that can be used for detecting and/or mitigating malicious client-side scripts. A software stack is a set of systems and components used to create a software platform. Applications can be executed on or run on the software platform. A software stack can be used to partition different functions of a software platform into abstraction layers. Generally, a particular layer provides a communication path with the layers adjacent (e.g., a layer above and a layer below) to the particular layer. Although a particular stack is illustrated, those skilled in the art and provided with this disclosure will recognize that other stacks are possible.

The base of the software stack 200 includes a hardware layer 210 and an operating system layer 220. For example, the hardware layer 210 can include a processor, memory, storage, and a communication interface. The operating system 220 can provide various kernel routines, such as routines for managing memory, beginning and ending computing processes and interfacing to components of the hardware layer 210. In other examples, hypervisor, virtual machine, and guest operating system layers can also be present. The client application 112 (e.g., a web browser) can be executed by the operating system 220. The client application 112 can be used to render objects 252 of an application page 122 on a client device. For example, the objects 252 can include form fields for entering information, windows for presenting information, buttons for selecting and/or confirming information, and so forth. As a specific example, the application page 122 can render a login screen to a client/server banking application. The objects of the page can include form fields for entering a login name and a password and a button can be used to send the login information to a server application controlled by a bank.

Functionality of the client application 112 can be extended using runtime environments (such as the script runtime environment 114) that are compatible with the client application 112. The JavaScript runtime environment is one example of a script runtime environment 114. The client application 112 and/or the script runtime environment 114 can provide a set of native APIs the developer can use to create scripts and pages that are rendered within the client application 112. For example, the set of native APIs can provide functions for human-computer interaction and for communicating with other devices, such as functions for data entry, data presentation, data formatting, animation, networking, and so forth. The native APIs are defined by the client application 112 and/or the script runtime environment 114. The set of native APIs can include APIs for HTML, JavaScript, Cascading Style Sheets, and other web technologies. Specific examples of APIs include HTMLInputElement, HTMLSelectElement, HTMLTextAreaElement, HTMLIFrameElement, XMLHttpRequest, TouchEvent, PointerEvent, InputEvent, and KeyboardEvent. The set of native APIs can be classified into sensitive and insensitive categories. For example, a sensitive API can be an API that could be used by an attacker to perform a malicious operation, such as gathering and/or sending confidential information to a domain associated with malicious activity. An insensitive API can be an API that is unlikely to be used by an attacker to perform a malicious operation, such as when the API is not used to gather information and/or send information over a network.

The supervisory script 124 can be loaded before other scripts (e.g. nonsupervisory scripts 270) on the page 122. As one example, the supervisory script 124 can be loaded before the other scripts when the supervisory script 124 is the first script referenced in a listing of a file specifying the objects and behavior of the page 122. The supervisory script 124 can add a layer of controls between the nonsupervisory scripts 270 and the client environment which includes the client application 112 and the script runtime environment 114. The controls can be used to collect data about the scripts executing on the page 122 and/or for mitigating potentially malicious actions. As a specific example, the client application 112 can include sensitive APIs 232 and insensitive APIs 234 and similarly the script runtime environment 114 can include sensitive APIs 242 and insensitive APIs 244.

The supervisory script 124 can include overriding APIs 262 which can be used to override some or all of the functionality of the at least some of the APIs of the client environment. For example, overriding APIs 262 can include an API that overrides some or all the functionality of an API within the sensitive APIs 232 and 242. For example, a given overriding API can have the same name and format as a corresponding sensitive native API while having different functionality. As one example, the native API can be specified to send information using an outgoing network request. The overriding API can be specified to collect a URI or domain name used in the API call, compare the URI or domain name to a list of blocked URIs or domains, and block the outgoing network request when the URI or domain name in the API call matches a blocked URI or domain name. The overriding API can perform various policy rule checks as defined by the optional policy rules 264. For example, the policy rules 264 can include the blocked domains or URIs. The supervisory script 124 can send the collected data to a security service, such as when the application page 122 is unloaded or replaced with a different application page.

Figure 3:
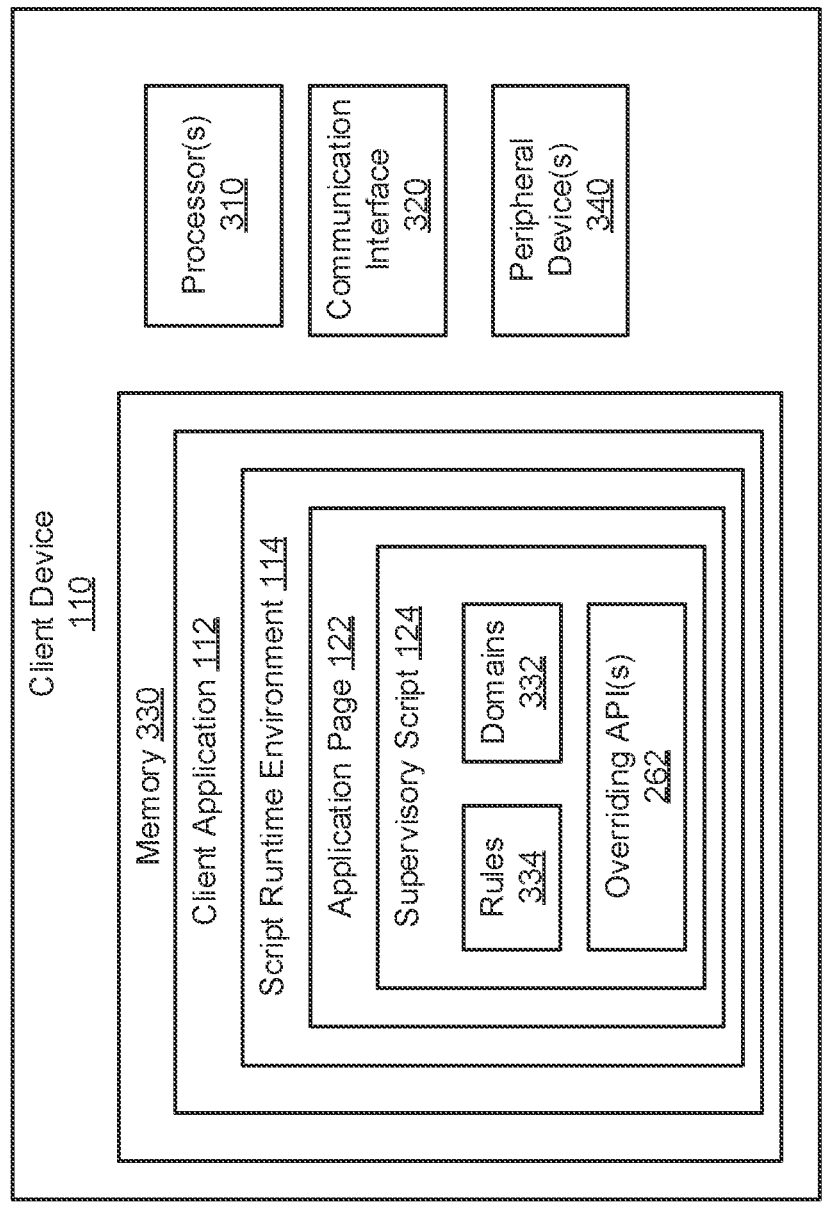
FIG. 3 illustrates a block diagram of an example client computer system that can be used in a system for detecting and/or mitigating malicious client-side scripts.

FIG. 3 illustrates an example client device 110 that can be used in a system for detecting and/or mitigating malicious client-side scripts. The client device 110 can be implemented using a computing environment as described in more detail with reference to FIG. 8.

The client device 110 can include one or more processor(s) 310, one or more communication interface(s) 320, memory 330, and one or more peripheral device(s) 340. The processor 310, communication interface 320, the memory 330, and the peripheral device(s) 340 can be coupled together with an interconnect (not shown) so that the components of the client device 110 can communicate with each other using the interconnect. The communication interface 320 can be used to send and receive communications (e.g., network packets) with other computing devices, such as an application server. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data (e.g., domains 332, rules 334, or other data structures) that is used by the software routines to perform the computing tasks. The peripheral devices 340 can include various devices for receiving and outputting information to a user of the client device 110 and for storing and/or retrieving information local to the client device 110. For example, the peripheral devices 340 can include a keyboard, a mouse, a display, a touchscreen, a speaker, a hard disk drive, a solid-state drive, and so forth.

The memory 330 can include different software routines for providing a client environment to execute client-side functions of a client-server application. For example, the client environment can include the client application 112 and the script runtime environment 114. The client application 112 can be configured to retrieve pages (e.g., the application page 122) from an application server (such as by sending requests for the pages via the communication interface 320) and to render the pages on the client device 110. The pages can include scripts and/or references to scripts that are executed by the script runtime environment 114. As one example, the pages can be specified in HTML and can include references to scripts that are specified using the JavaScript programming language.

The application page 122 can include the supervisory script 124 which provides a layer of controls between the client environment and other scripts that are included on and/or referenced by the application page 122. For example, the supervisory script 124 can be configured to record operations and/or interactions between the scripts of the page and the objects of the page 122 and/or the APIs of the client environment. As one example, the overriding APIs 262 can be instrumented to record access to the APIs. Specifically, an overriding API can include the function of its corresponding native API and the instrumentation functions. The recorded behavior can be collected by the supervisory script 124 and sent to a security service executing on a security application server where it can be analyzed to detect potentially malicious behavior. Additionally or alternatively, some or all types of the recorded behavior can be analyzed by the supervisory script 124 to detect potentially malicious behavior. Analysis of the potentially malicious behavior can yield a set of domains 332 and/or rules 334 that can be used to mitigate the potentially malicious behavior.

The supervisory script 124 can be configured to mitigate potentially malicious behavior using the overriding APIs 262, the domains 332, and/or the rules 334. For example, each overriding API can override a native API having the same name as the overriding API. Generally, the overriding API can be used to prevent the capture, modification, and/or transmission of confidential and/or valuable information to a potentially malicious party. The overriding API can include additional and/or different functionality than the native API. For example, the overriding API can include checks (e.g., from the rules 334) that are not in the native API and are performed prior to performing the architected operation of the native API. As one example, the checks can be performed prior to capturing, modifying, and/or sending data to a server external to the client device 110. As one example, the domains 332 can include a list of domain names on a deny list, and outgoing network requests to any server identified on the deny list can be blocked from being sent. As another example, data going to a server identified on the deny list can be garbled and/or falsified in a request sent to the identified server on the deny list. Mitigation operations of the overriding APIs can include blocking operations of the native API, redirecting operations of the native API, transforming operations of the native API, and/or falsifying operations of the native API. For example, network requests of a script can be blocked; network requests of the script can be redirected to a different domain, such as the domain associated with the security service; a response to a network request of a script can be populated with predefined (e.g., a 504 gateway time-out) or algorithmically generated information; and/or network requests of the script can be modified in other various ways. As another example, scripts can be blocked from accessing particular form fields; and/or the information from a form field can be modified and/or falsified (e.g., the provided value can be an empty string) when providing the information to a script.

Figure 4:
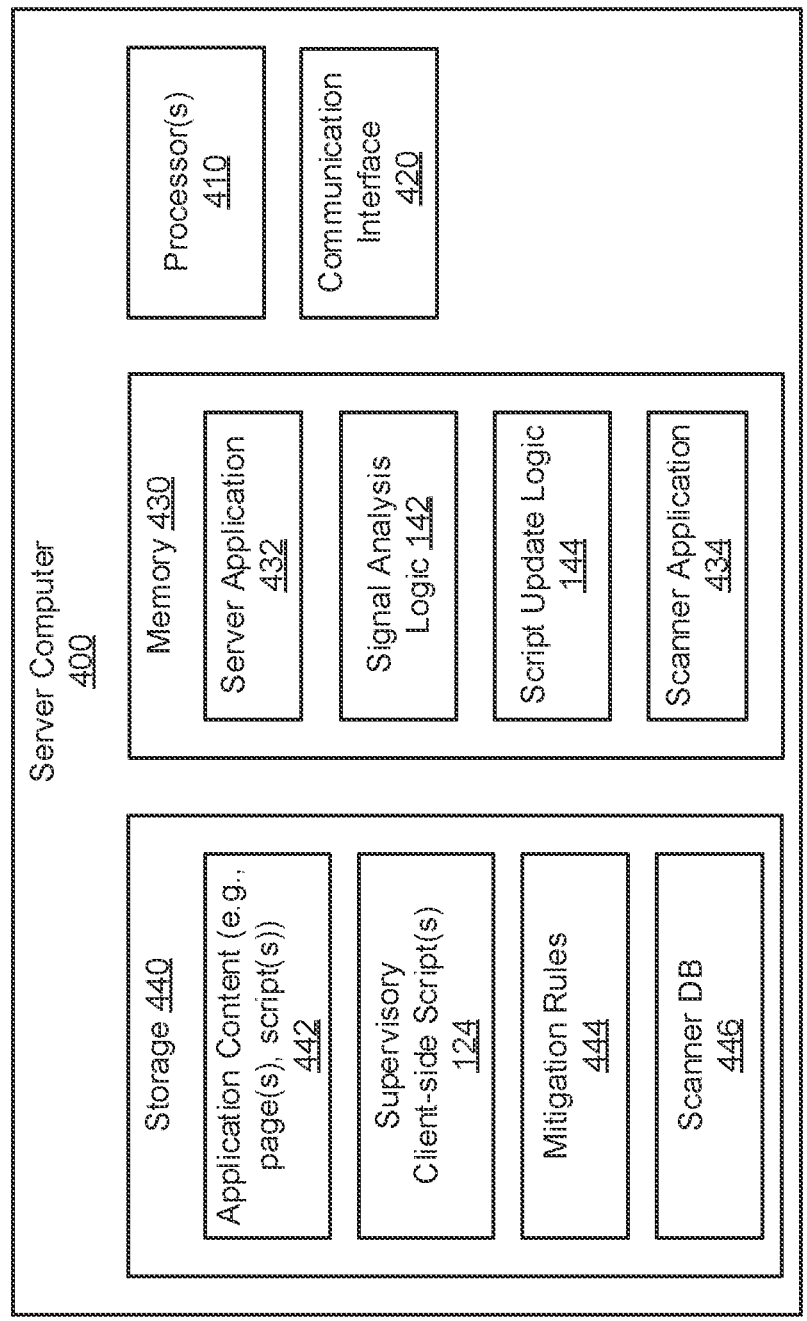
FIG. 4 illustrates a block diagram of an example server computer system that can be used in a system for detecting and/or mitigating malicious client-side scripts.

FIG. 4 illustrates an example server computer 400 that can be used in a system for detecting and/or mitigating malicious client-side scripts. The server computer 400 can be implemented using a computing environment as described in more detail with reference to FIG. 8. As illustrated, the server computer 400 can perform operations of a security service, script server, and/or an application server. However, in other examples, the operations of the security service, the script server, and/or the application server can be separated onto different server computers.

The server computer 400 can include one or more processor(s) 410, one or more communication interface(s) 420, memory 430, and storage 440. The processor 410, communication interface 420, the memory 430, and the storage 440 can be coupled together with an interconnect (not shown) so that the components of the server computer 400 can communicate with each other using the interconnect. The communication interface 420 can be used to send and receive communications (e.g., network packets) with other computing devices, such as an application server. The processor 410 can be used to execute computer-executable instructions that are stored in the memory 430 and/or storage resources 440. The computer-executable instructions can be organized into software routines (also referred to as modules or components) comprising executable code to perform various computing tasks. It should be noted that while FIG. 4 illustrates one organization of routines, other organizations are possible. For example, the illustrated routines can be subdivided into smaller routines and/or combined into larger routines. The memory 430 can also include structured and/or unstructured data (e.g., mitigation rules 444, scanner database (DB) 446, or other data structures) that is used by the software routines to perform the computing tasks.

The server application 432 can serve content to a client device in response to requests from the client device. The content can include application content 442 such as pages, scripts, and other data. For example, the server application 432 can send webpages in response to browsers' requests for the webpages. The pages can include objects that can be rendered on a client device, scripts and/or references to scripts that can be executed on the client device. The pages can include a supervisory client-side script 124 which can be used at the layer of controls between the client environment and nonsupervisory scripts executing on the client device. The server application 432 can also send supplementary information for the supervisory client-side scripts 442, such as mitigation rules 444. The mitigation rules 444 can include rules used by the overriding APIs that are defined within the supervisory client-side scripts 124. For example, the mitigation rules 444 can include URIs and/or domains associated with potentially malicious activity. The mitigation rules 444 can be generated using data collected by a security service.

The server computer 400 can perform the operations of a security service. As one example, the supervisory client-side script 124 can collect script usage data and send the script usage data to the security service for analysis. The script usage data can be stored in the scanner database 446. As another example, a scanner application 434 can collect script usage data for the security service. Specifically, the scanner application 434 can emulate a client device by retrieving application content 442 and simulating user interactions to determine how the scripts interact with the page content. The script activity data can be collected by the scanner application 434 and stored in the scanner database 446. However, the scanner application 434 may react to the page elements differently than the group of users and so the script usage data collected by the scanner application 434 may differ from script usage data from a collection of human users.

Regardless of how the script usage data is collected, the script usage data can be analyzed by the signal analysis logic 142 to determine potentially malicious script activity. As one example, current script usage data can be collected and compared to historical script usage data to detect changes in script activity, such as sending outbound network requests to new domains. A change in script activity may indicate that the script has been compromised by a malicious user. As another example, scripts accessing sensitive data such as a password fields, account numbers, personal identifying information, and the like, can be identified and potentially labeled as malicious. Since some scripts may legitimately access the sensitive data, additional filtering can be used to separate out legitimate script access to sensitive data as opposed to malicious script access to sensitive data. The script update logic 144 can use the results of the signal analysis logic 142 to update the supervisory client-side script 124 and the mitigation rules 444 so that newly identified malicious activity can potentially be mitigated. For example, the script update logic 144 can identify the APIs that may be used by malicious scripts and/or can detect potentially malicious URIs and/or domains.

The application content 442 can include content for multiple applications. Each of the applications can have multiple pages associated with the application. Each page of the application and of the different applications can have a different supervisory client-side script associated with that page. Each supervisory client-side script can have different overriding APIs and different mitigation rules to account for different purposes of the different pages and/or applications. For example, highly secure applications may implement more restrictions than less critical applications. As a specific example, the supervisory client-side script of a login page of a banking application can block the loading of any script and the reading of any form field. As another example, a supervisory client-side script of a home page for a small business may only block the outgoing network requests to known malicious domains.

Example Methods for Detecting and/or Mitigating Malicious Client-Side Scripts

Figure 5:
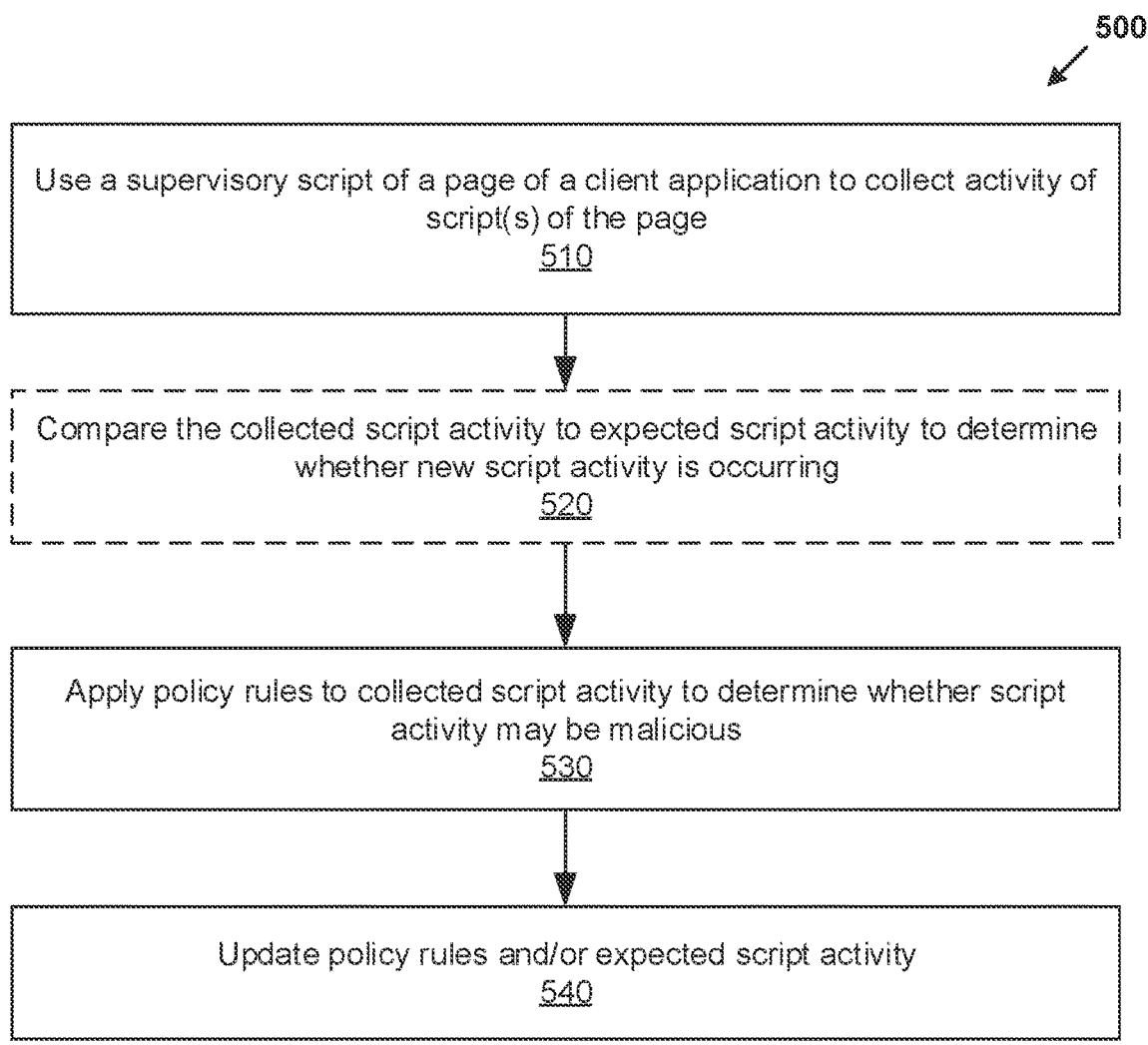
FIG. 5 illustrates a flowchart of an example method for detecting malicious client-side scripts.

FIG. 5 illustrates a flowchart of an example method 500 for detecting malicious client-side scripts. For example, a client-server architecture, such as described above with reference to FIGS. 1-4, can be used to detecting malicious client-side scripts. As one example, the method 500 can be implemented using a server computer, such as described above with reference to FIG. 4. For example, computer-executable instructions for carrying out the method 500 can be stored in computer-readable memory (e.g., the memory 430) and the instructions can be executed by one or more processor(s) (e.g., the processor 410) to perform the method 500.

At 510, a supervisory script of a page of a client application can be used to collect activity of scripts of the page. As one example, the client application can be a browser application executed on a client device, where the browser application is configured to render the page. The supervisory script of the page can be loaded before other scripts of the page and can provide a layer of controls between the client application execution environment and the nonsupervisory scripts of the page. The scripts of the page can be incorporated within the page and/or can be referenced by the page (e.g., the page can be referenced using a URI that can be used to retrieve the page using a network connection). The activity can be collected and organized in various ways. For example, the activity of a given script can be collected and stored in a data structure corresponding to the given script, and the per script data structures can be organized in a data structure for the page to represent the script activity occurring on the page. The script activity can include the form fields accessed (e.g., read and/or written) by the script, the URI or domain used to fetch the script, the APIs used by the script, the domains of network requests used by the script, combinations of script activities (such as reading a form field and sending a network request), and so forth. The script activity can include circumvention techniques such as creating an iframe, and so forth.

At optional 520, the collected script activity can be compared to expected script activity to determine whether new script activity is occurring. As one example, the script can be expected to use a known or predefined set of domains, and if the script uses a domain outside of the known set then the previously unknown domain can be unexpected and potentially malicious. As another example, a script can be observed to access no or a limited set of form fields, and if the access pattern of the script changes (e.g., a different form fields are accessed) then the access pattern can be unexpected and potentially malicious. As another example, scripts can be loaded from an unexpected domain, when the domain has not been collected in a historical collection of domains used by the page. New script activity can indicate that the script has been compromised or merely that a publisher of the script or page has modified a behavior of the script or page. Accordingly, new URIs and/or domains that are observed can be compared to known malicious URIs and/or domains as another indication of whether the script activity is malicious.

At 530, the policy rules can be applied to the collected script activity to determine whether the script activity may be malicious. As described at 520, unexpected script activity may indicate that the script activity is malicious. Additional rules can be applied, and violations of the rules can be used to determine potentially malicious script activity. For example, a policy rule can indicate that a script should not access a password form field. When the password form field is accessed by a script, the script can be labeled as potentially malicious. As another example, a policy rule can indicate that the script should not be loaded from a set of suspected malicious domains. As another example, a policy rule can indicate that the script should never send data over a network to a suspected malicious domain. The potentially malicious activity can be further analyzed to determine whether the supervisory client-side script and/or policy rules are to be updated. As another example, a policy rule can indicate that first-party scripts be subject to fewer or different checks than third-party scripts.

At 540, the policy rules and/or expected script activity can be updated based on the analysis of the collected script activity. For example, domains associated with a violation of the policy rules can be added to the suspected malicious domains. As another example, protected form fields can be identified and scripts can be prevented from accessing the protected form fields. Alternatively, random, algorithmic, or predefined values can be returned when a script accesses a protected field.

Figure 6:
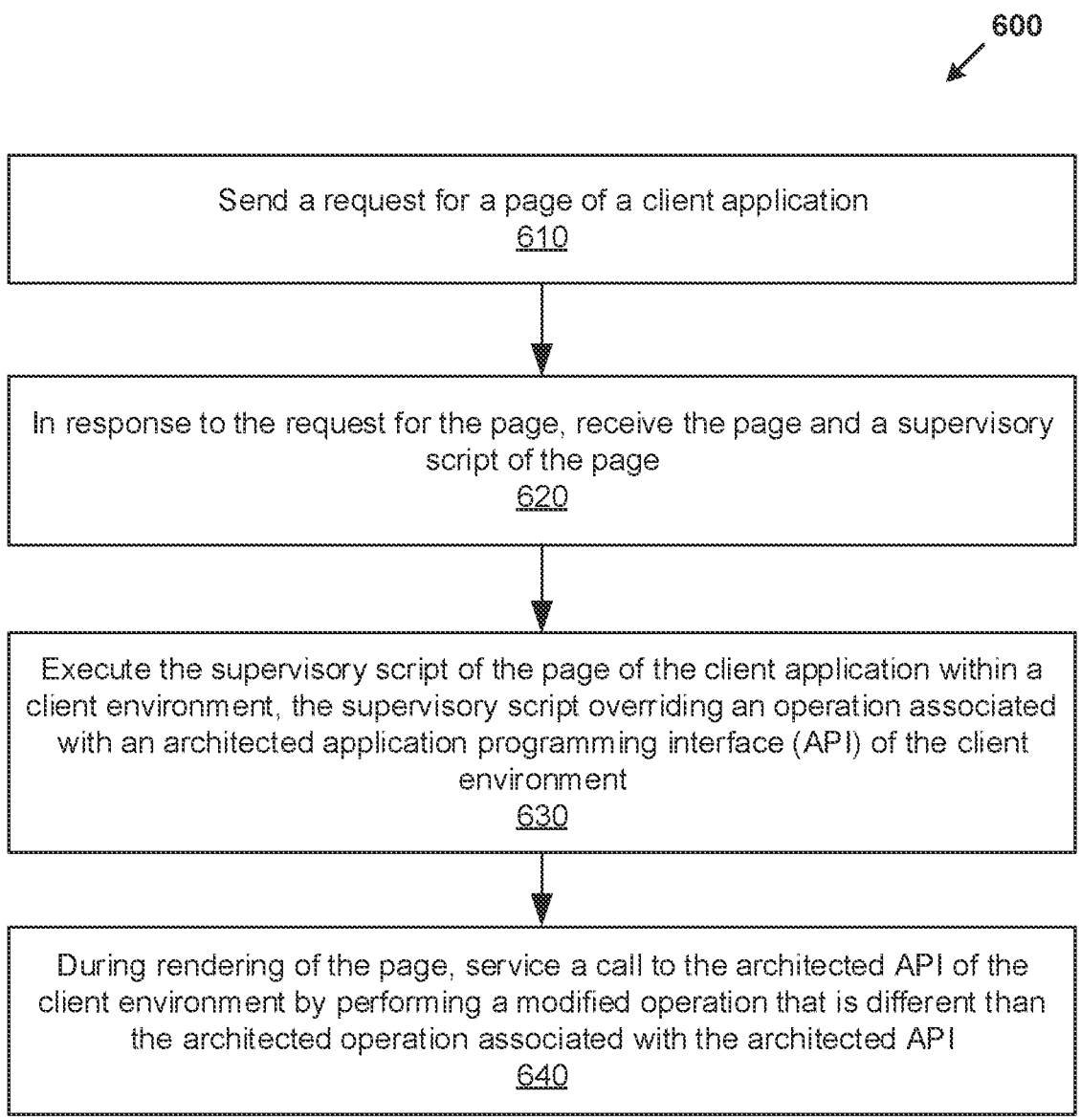
FIG. 6 illustrates a flowchart of an example method for mitigating malicious client-side scripts.

FIG. 6 illustrates a flowchart of an example method 600 for mitigating malicious client-side scripts. For example, a client-server architecture, such as described above with reference to FIGS. 1-5, can be used to detecting and/or mitigating malicious client-side scripts. As one example, the method 600 can be implemented using a client device, such as described above with reference to FIG. 3. For example, computer-executable instructions for carrying out the method 600 can be stored in computer-readable memory (e.g., the memory 330) and the instructions can be executed by one or more processor(s) (e.g., the processor 310) to perform the method 600.

At 610, a request can be sent for a page of a client application. Generally, the client application can be client-side software of a client-server application. As one example, the client application can be a web browser, and the request can be for a web page to be displayed by the web browser. The request for the web page can be addressed to a web server. As another example, the client application can be a software application downloaded from a digital distribution platform (one of these applications can be referred to as an "app") and installed on a client device. The request for the page can be sent from the client application to a server executing server-side software for responding to requests from clients.

At 620, in response to the request for the page, the page and a supervisory script of the page can be received. The supervisory script of the page can be incorporated directly within the page and/or a location of the supervisory script can be referenced within the page. For example, a first portion of the supervisory script can be inline with the page and a second portion of the supervisory script can be located at a URI that is identified within the page. The supervisory script can be customized for the requested page, such that different pages can used different supervisory scripts. The customizations can be based on the APIs used by the page and its scripts, the type of application and a level of security to be achieved, characteristics and/or policies of the publisher and/or requestor, behaviors observed on the page or by one of its scripts, a type of data collected by the page, and so forth. As one example, the customizations can be generated by a security service that analyzes script activity occurring on the page (e.g., historical activity of the page) when the page is rendered on a variety of clients and/or by the security service (e.g., a scanner of the security service). Accordingly, the customizations can enable the supervisory script to dynamically adapt based on observed activities of the scripts and client interactions with the scripts.

The supervisory script can be created by a publisher of the page and/or a security service that analyzes client activity of the page. As one example, the supervisory script can be stored on and sent from the host of the server application. As another example, the supervisory script can be inserted by an intermediary computer (such as described further below with reference to FIG. 7). As another example, the supervisory script can be stored on and sent from a host that is different from the host of the server application, such a server of a security service. The supervisory script can include overriding APIs of a client environment, policy rules, and/or domains where network access is to be denied or permitted.

At 630, the supervisory script of the page of the client application can be executed within a client environment. The client environment can include the client application and a script runtime environment. For example, the client application can be a web browser, the page can be a web page specified using the HTML language which may include JavaScript scripts and/or references to JavaScript scripts. The supervisory script can be executed before the other scripts (also referred to as the nonsupervisory scripts) of the page and can provide a layer of controls between the client environment and the nonsupervisory scripts.

The supervisory script can override an operation associated with an architected application programming interface (API) of the client environment. For example, the APIs can specify objects of the page (e.g., form fields, buttons, windows, animations, network resources, and so forth), data types and/or structures, and behaviors (e.g., network requests, events and event handlers, and so forth). A particular API can have a type (e.g., "XMLHttpRequest"), properties, methods, parameters, and/or a format. An architected API can be used to perform one or more default operations defined by the client environment. For example, architected APIs can be specified by the HTML or JavaScript languages or by the client application (e.g., a browser extension). As a specific example, a browser application can define the XMLHttpRequest API to perform operations to interact with a server computer (such as sending a network request). A URI can be passed to the XMLHttpRequest API to send a network request to the server at the domain identified by the URI. The supervisory script can redefine the architected API (using an overriding API) so that when the API on the page is rendered, the operations of the overriding API are performed instead of the operations of the architected API. As a specific example, the XMLHttpRequest API can be redefined (e.g., overridden) by the supervisory script so that the XMLHttpRequest API behaves differently than the default operation defined by the browser application.

At 640, during rendering of the page, a call to the architected API of the client environment can be serviced by performing a modified operation that is different than the architected operation associated with the architected API. Specifically, rendering the page can include executing the supervisory script and redefining the architected API with an overriding API. When a non-supervisory script calls an architected API, the operations of the overriding API will be performed instead of the default behavior of the architected API. The operations of the overriding API can be different than the architected operations associated with the architected API. For example, the overriding API can add operations and/or remove operations to the default architected operations. As another example, the overriding API can perform operations that are completely different from the default architected operations. As a specific example, the overriding XMLHttpRequest API can add checks to determine whether policy rules are being followed, and can block outgoing network requests when the policies are not followed. For example, the domain of a URI passed to the XMLHttpRequest API can be compared to malicious domains, and if a malicious domain is identified in the URI, the network request can be blocked.

Generally, mitigation techniques that can be applied by the overriding APIs can include blocking, redirecting, falsifying, and/or transforming operations. For example, network requests can be blocked, redirected to a security service for further analysis, or provided with data that is different than the default architected API would provide. As a specific example, the operation of an architected API can be to load another script associated with a domain name and the modified operation can be to block the loading of the other script. As another example, the operation of an architected API can be to read information from a particular form field and the modified operation can be to return a value that is different than the value from the particular form field.

The systems, techniques, and devices described herein can be used to implement a closed loop system for detecting and/or mitigating malicious scripts that execute within a client environment. For example, a supervisory script of a page of an application executing within the client environment can be used to collect information about other scripts associated with the page (e.g., referenced directly or indirectly from the page). Specifically, the supervisory script can alter APIs used within the environment to collect information about other scripts that access said APIs. The information collected by the supervisory script can be transmitted to a backend service (e.g., a security service) using the instrumented APIs. The collected information can detail how each script interacts with the APIs, the page, and/or the application. The backend service can analyze the collected information and recommend rules that can be sent along with the supervisory script to the application (e.g., a browser) for subsequent visits to the page (e.g., a website). The rules can be implemented by the supervisory script to prevent access to the APIs for certain scripts, thereby preventing the scripts from doing harm when a user accesses the page. For example, the rules can be used to prevent a script from accessing sensitive data or contacting a malicious domain.

Example Computing Environments

Figure 7:
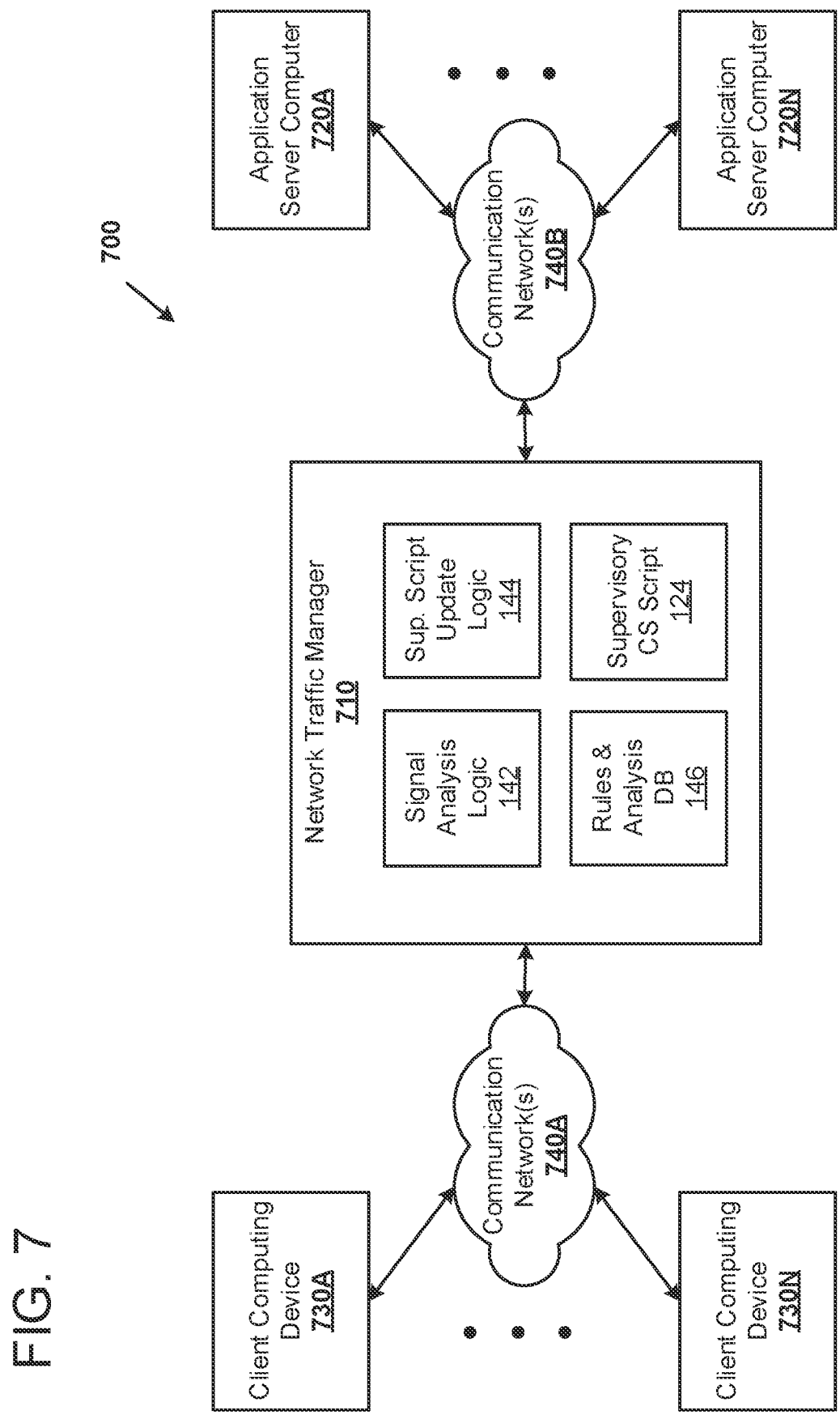
FIG. 7 illustrates a system diagram of an example client-server architecture including a network traffic management apparatus implementing a method for detecting and/or mitigating malicious client-side scripts.

FIG. 7 illustrates an example client-server architecture 700 (also referred to as a network traffic management system) that incorporates a network traffic manager 710. The client-server architecture 700 includes a network traffic manager 710 that is coupled to one or more server computers (such as application server computers 720A-N) and one or more client devices (such as client computing devices 730A-N) via one or more communication networks (such as the communication networks 740A and 740B). The server computers 720A-N can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic manager 710 is positioned in-line between the client computing devices 730A-N and the application server computers 720A-N so that the network traffic manager 710 can intercept all network traffic flowing between the different networks 740A and 740B. In other examples, the network traffic manager 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic manager 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
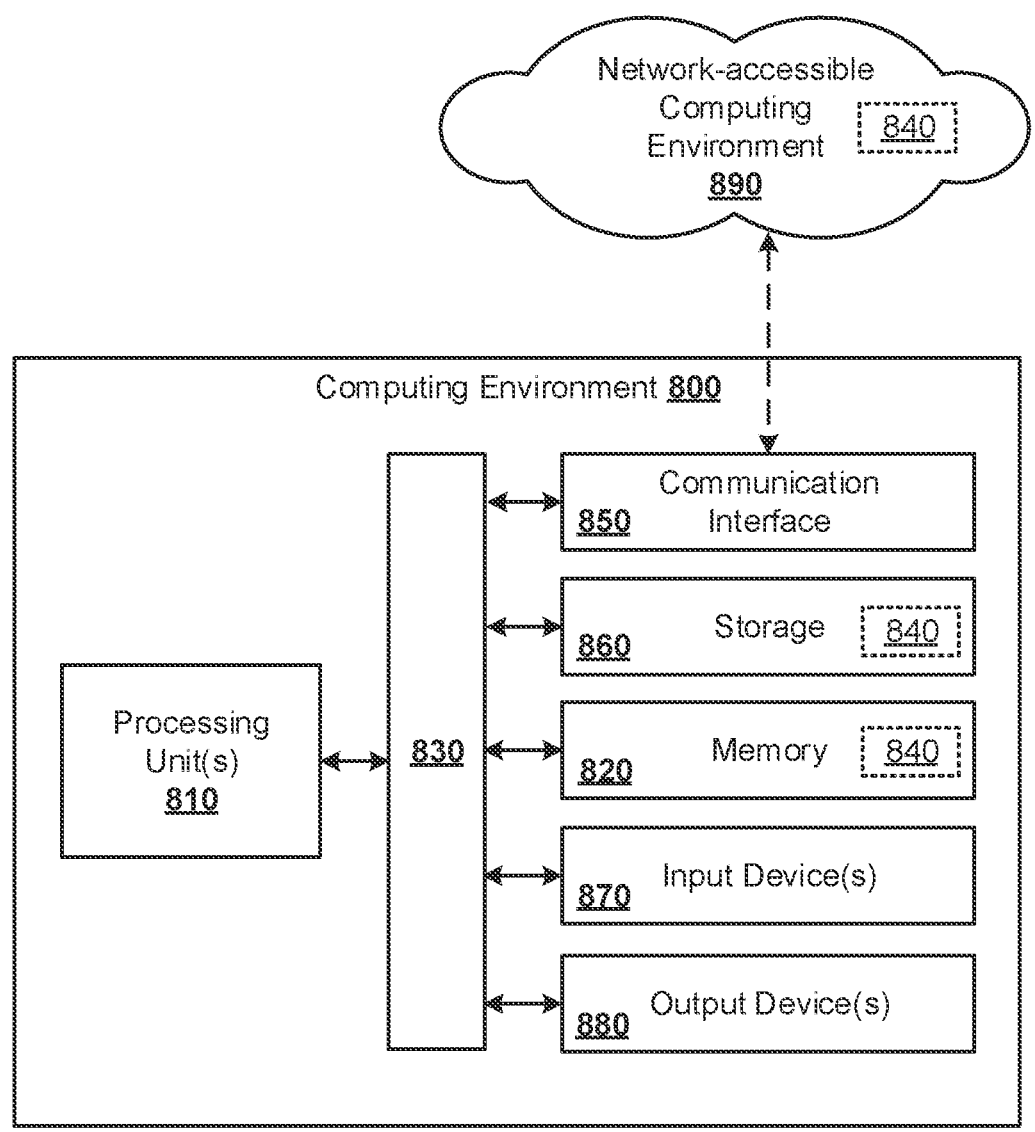
FIG. 8 illustrates a block diagram of an example computing environment, such as can be used for a client or server computer implementing a method for detecting and/or mitigating malicious client-side scripts.

Generally, the application server computers 720A-N, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic manager 710 or the server computers 720A-N.

The application server computers 720A-N can include any type of computing device that can exchange network data. For example, the server computers 720A-N can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic manager 710) in response to requests from the client devices 730A-N. The server computers 720A-N can be hardware and/or software and may represent a system with multiple servers in a pool, which may include internal or external networks.

While the application server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic manager 710 itself rather than as a stand-alone server device communicating with the network traffic manager 710 via communication network 740B. In this example, the one or more of the server computers 720A-N operate within the memory of the network traffic manager 710.

The network traffic manager 710 can include any type of computing device that can be used for managing network traffic. The network traffic manager 710 can perform a number of functions, including providing network security, access control, load balancing network traffic across the server computers 720A-N, and/or accelerating network traffic associated with an application hosted by one or more of the server computers 720A-N, for example. Network service(s) 750 can be used to perform some or all of the functions of the network traffic manager 710. For example, the service(s) can perform proxy and other services on behalf of the server 720A-N and manage traffic between the clients 730A-N and the servers 720A-N. Additionally, the network traffic manager 710 can include other network devices such as one or more routers or switches, for example.

The network traffic manager 710 can include hardware and/or software modules for detecting and/or mitigating malicious client-side scripts as described above with reference to FIGS. 1-6. Specifically, the network traffic manager 710 can perform operations of a security service and/or an application server. For example, operations of the application server computers 720A-N can be offloaded to the network traffic manager 710. As a specific example, the network traffic manager 710 can insert the supervisory client-side script 124 into pages that are sent from the server computers 720A-N to the client computing devices 730A-N. In this manner, the network traffic manager 710 can act as a central repository for the application server computers 720A-N so that updates to the supervisory client-side script 124 can be incorporated into the webpages served from the application server computers 720A-N. Data collected by the supervisory client-side script 124 executing on the client computing devices 730A-N can be sent to the network traffic manager 710 and analyzed by the signal analysis logic 142. The output from the signal analysis logic 142 can be used to update the rules and analysis database 146 and/or the supervisory client-side script 124.

While the network traffic manager 710 is illustrated in this example as including a single device, the network traffic manager 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic manager 710. Additionally, the network traffic manager 710 and/or the application(s) executed by the network traffic manager 710 can be operative in a cloud-based computing environment. The application(s) can be executed within or as virtual machine(s) or virtual server(s) that can be managed in a cloud-based computing environment. For example, the application(s), and even the network traffic manager 710 itself, can be located in virtual server(s) running in a cloud-based computing environment rather than being tied to one or more specific physical network computing devices. Also, the application(s) can be running in one or more virtual machines (VMs) executing on the network traffic manager 710. Additionally, in one or more examples of this technology, virtual machine(s) running on the network traffic manager 710 can be managed or supervised by a hypervisor. Additionally, one or more of the components that together comprise the network traffic manager 710 can be standalone devices or integrated with one or more other devices or apparatuses, such as with one or more of the server computers 720A-N, for example.

Additionally, one or more of the components depicted in the client-server architecture 700, such as the network traffic manager 710, server computers 720A-N, or client computing devices 730A-N, for example, may be configured to operate as virtual instances on the same physical machine. In other words, one or more of the network traffic manager 710, server computers 720A-N, or client computing devices 730A-N may operate on the same physical device rather than as separate devices communicating through communication networks 740A and 740B. Additionally, there may be more or fewer network traffic managers, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic including an intermediary server that performs the disclosed techniques for detecting and/or mitigating malicious client-side scripts.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic manager 710 operatively couples to and communicates with the communication networks 740A and 740B so that the network traffic manager 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for detecting and/or mitigating malicious client-side scripts) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented in cooperation with a network computer system comprising one or more client devices or server computers, the method comprising:
    sending a request for a page of a client application;
    in response to the request for the page, receiving the page and a supervisory script of the page;
    executing the supervisory script of the page of the client application within a client environment, the supervisory script overriding an operation associated with an architected application programming interface (API) of the client environment; and
    during rendering of the page, servicing a call to the architected API of the client environment by performing a modified operation that is different than the architected operation associated with the architected API.

2. The method of claim 1, wherein the architected API specifies a uniform resource identifier (URI) parameter, and the modified operation comprises comparing a domain name of the URI to a plurality of domain names before performing a network request.

3. The method of claim 1, wherein the page comprises a plurality of scripts, and the supervisory script is the first script of the page that is executed.

4. The method of claim 1, wherein the architected operation is loading another script associated with a domain name and the modified operation is to block the loading of the other script.

5. The method of claim 1, wherein the architected operation is reading information from a particular form field and the modified operation is to return a value that is different than the value from the particular form field.

6. The method of claim 1, wherein the architected API of the client environment is a native function of a client browser application.

7. The method of claim 1, wherein the architected API of the client environment is a native function of a programming language implemented by the client environment.

8. A system comprising one or more network application client modules or server modules, memory comprising programmed instructions stored thereon, and one or more processors configured to be capable of executing the stored programmed instructions to:
    send a request for a page of a client application;
    in response to the request for the page, receive the page and a supervisory script of the page;
    execute the supervisory script of the page of the client application within a client environment, the supervisory script overriding an operation associated with an architected application programming interface (API) of the client environment; and
    during rendering of the page, service a call to the architected API of the client environment by performing a modified operation that is different than the architected operation associated with the architected API.

9. The system of claim 8, wherein the architected API specifies a uniform resource identifier (URI) parameter, and the modified operation comprises comparing a domain name of the URI to a plurality of domain names before performing a network request.

10. The system of claim 8, wherein the page comprises a plurality of scripts, and the supervisory script is the first script of the page that is executed.

11. The system of claim 8, wherein the architected operation is loading another script associated with a domain name and the modified operation is to block the loading of the other script.

12. The system of claim 8, wherein the architected operation is reading information from a particular form field and the modified operation is to return a value that is different than the value from the particular form field.

13. A non-transitory computer readable medium having stored thereon instructions comprising executable code that, when executed by one or more processors, causes the one or more processors to:
    send a request for a page of a client application;
    in response to the request for the page, receive the page and a supervisory script of the page;
    execute the supervisory script of the page of the client application within a client environment, the supervisory script overriding an operation associated with an architected application programming interface (API) of the client environment; and
    during rendering of the page, service a call to the architected API of the client environment by performing a modified operation that is different than the architected operation associated with the architected API.

14. The computer readable medium of claim 13, wherein the architected API specifies a uniform resource identifier (URI) parameter, and the modified operation comprises comparing a domain name of the URI to a plurality of domain names before performing a network request.

15. The computer readable medium of claim 13, wherein the architected operation is loading another script associated with a domain name and the modified operation is to block the loading of the other script.

16. The computer readable medium of claim 13, wherein the architected operation is reading information from a particular form field and the modified operation is to return a value that is different than the value from the particular form field.

17. A client computer apparatus, comprising memory comprising programmed instructions stored thereon and one or more processors configured to be capable of executing the stored programmed instructions to:
- send a request for a page of a client application;
- in response to the request for the page, receive the page and a supervisory script of the page;
- execute the supervisory script of the page of the client application within a client environment, the supervisory script overriding an operation associated with an architected application programming interface (API) of the client environment; and
- during rendering of the page, service a call to the architected API of the client environment by performing a modified operation that is different than the architected operation associated with the architected API.

18. The client computer apparatus of claim 17, wherein the architected API specifies a uniform resource identifier (URI) parameter, and the modified operation comprises comparing a domain name of the URI to a plurality of domain names before performing a network request.

19. The client computer apparatus of claim 17, wherein the architected operation is loading another script associated with a domain name and the modified operation is to block the loading of the other script.

20. The client computer apparatus of claim 17, wherein the architected operation is reading information from a particular form field and the modified operation is to return a value that is different than the value from the particular form field.

* * * * *